United States Patent [19]

Hansen

[11] Patent Number: 4,506,354

[45] Date of Patent: Mar. 19, 1985

[54] ULTRASONIC POSITION DETECTING SYSTEM

[75] Inventor: Per K. Hansen, Burlington, Vt.

[73] Assignee: Position Orientation Systems, Ltd., Burlington, Vt.

[21] Appl. No.: 429,856

[22] Filed: Sep. 30, 1982

[51] Int. Cl.³ .............................................. G01S 15/04
[52] U.S. Cl. .................... 367/101; 367/108; 367/907
[58] Field of Search ................. 367/99, 101, 107, 108, 367/117, 907

[56] References Cited

U.S. PATENT DOCUMENTS 3,653,031 3/1972 Hlady et al. .................. 367/108 X
4,124,838 11/1978 Kiss ...................................... 367/99

Primary Examiner—Richard A. Farley
Attorney, Agent, or Firm—Sherman & Shalloway

[57] ABSTRACT

A system measures the (x, y) coordinates of a target, for example, a pointed finger on a flat surface such as a rectangular plate. A pair of ultrasonic transducers are placed on the plate so that one transducer is located at each of the two left corners of the plate or at each of the two top corners of the plate. The transducers transmit short ultrasonic pulses which are reflected as echos off the target and then received by the transducers. The time elapsed between the transmitting of each pulse and receiving its echo is converted into distances between the transducers and the target, which distances are then converted into the target's (x, y) coordinates.

The system is designed to clamp onto a number of flat surfaces, thereby allowing the system to be used with printed representations of keyboards, graphs, CRT monitors and standard television screens. The system is interfaced with any of a variety of computers and provides a signal representative of the location of the target to the computer.

The system is also designed so that it can be placed inside any new or existing frame around the flat surface.

26 Claims, 12 Drawing Figures

Fig. 1B
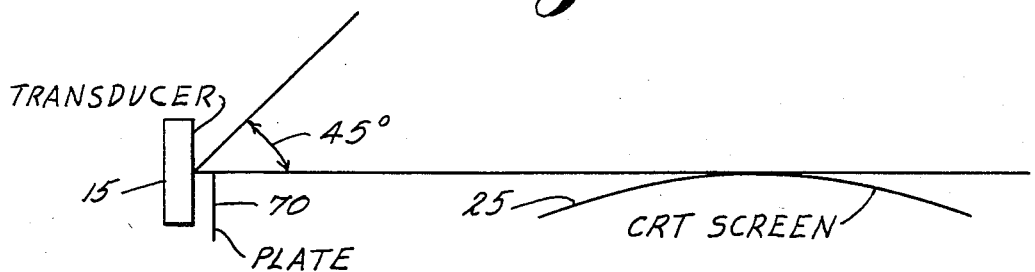
PLACEMENT OF THE TRANSDUCER, THE PLATE, AND THE CRT SCREEN
Fig. 1C
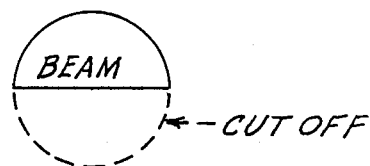
THE HALF OF THE BEAM
Fig. 7
| CONTROL | 1 | 2 | 3 | 4 | 5 | 6 | 7 | 8 |
|---|---|---|---|---|---|---|---|---|
| TRANSMIT #1 RECEIVE #1 | 1 | 0 | 1 | 1 | 0 | 0 | 0 | 0 |
| TRANSMIT #2 RECEIVE #2 | 0 | 1 | 0 | 0 | 1 | 1 | 0 | 0 |
| TRANSMIT #1 RECEIVE #2 | 1 | 1 | 1 | 0 | 0 | 1 | 1 | 0 |
| TRANSMIT #2 RECEIVE #1 | 1 | 1 | 0 | 1 | 1 | 0 | 0 | 1 |

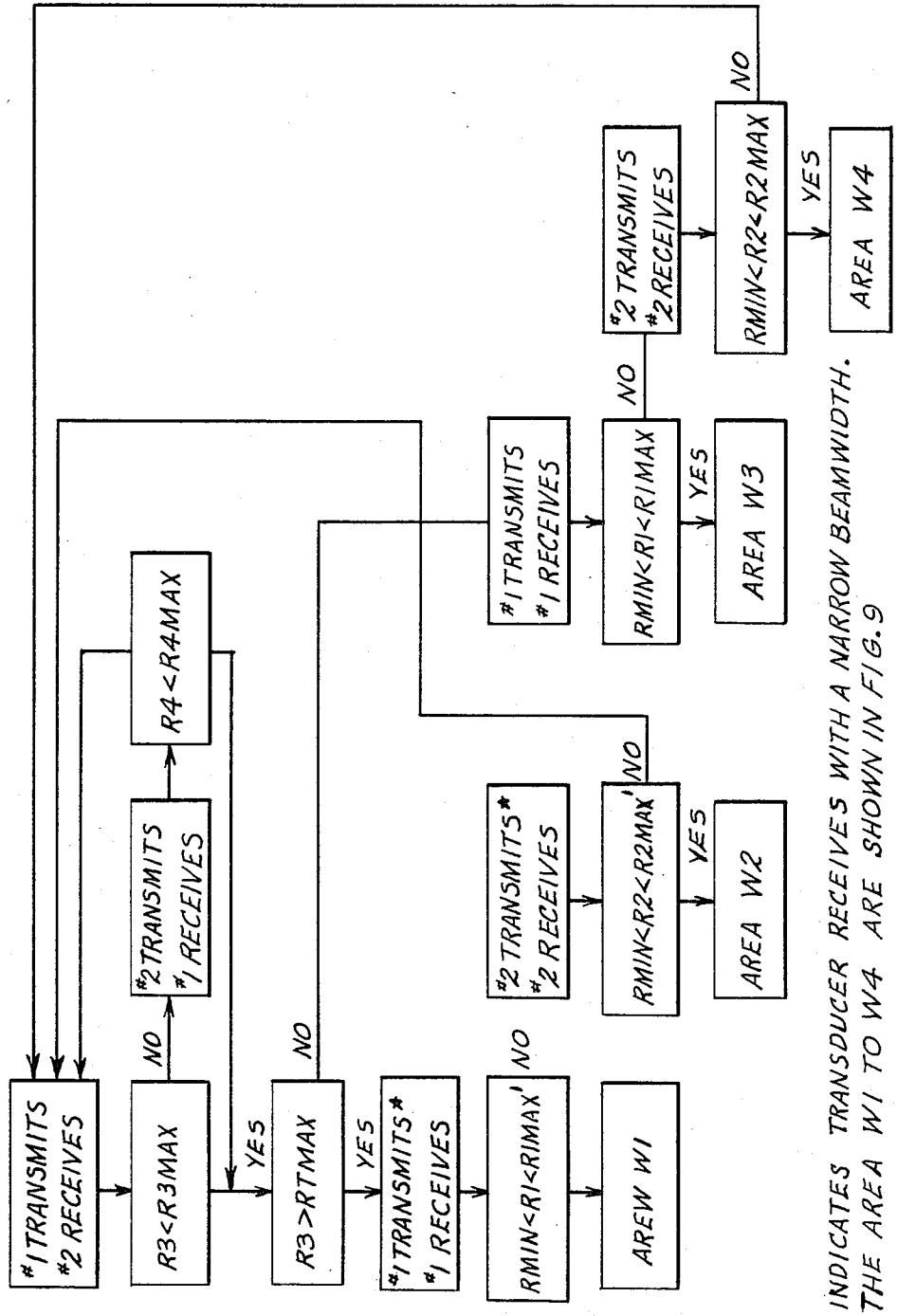

ULTRASONIC POSITION DETECTING SYSTEM

BACKGROUND OF THE INVENTION

1. Field of the Invention

This invention is concerned with a device which determines the position of an object such as the human finger in a plane, usually for the purpose of providing a human interface with a computer, wherein the interface is adaptable to a large variety of surfaces. The system uses ultrasonic techniques.

2. Brief Description of the Prior Art

Prior art position sensors for computers have included keyboards and specialized CRT screens, as well as (x, y) coordinate sensors which required the use of a stylus. The keyboard systems have used either mechanical switches or various types of touch-sensitive switches, such as capacitive switches. They have, of course, been limited to the specific configuration of the keys of the keyboard, although the functions of the keys could change. Keyboard switches could be used to direct the position of an indication appearing on a CRT screen by causing the indication to move in response to keys pressed. Likewise, a joystick could also be used for remote actuation of an indication on a screen.

Specialized CRT screens typically include conductive portions on the facemask of the screen. The user touches that portion of the screen which displays an indication. That portion must coincide with one conductive segment of the screen. Obviously, the computer program has to be fitted to the number of conductive segments available.

Systems have been developed which use reflected sound waves to determine the position of a stylus. Because of the nature of operation of these prior art devices, diverse objects such as the human finger could not be used and a stylus was required. Furthermore, these systems were not adapted to be placed over a wide variety of surfaces because of the inherent tendency of altered surfaces to alter the echo signals received. These problems are caused by the method of transmitting and receiving signals, as well as by the nature of the transducers used in the prior art which required a specialized environment beyond that of a particular flat surface in a more-or-less rectangular area to one side of the set of transducers. Furthermore, these systems use a transducer for transmitting and two transducers for receiving and cannot be placed inside a frame around the flat surface.

Other devices have been used to detect the positions of a wide variety of objects, using a specialized surface. In these devices, the specialized surface itself reacts to sound wave energy. Clearly, the specialized surface must, at the very least, be placed over another surface in order that another surface be used as a display. Usually, even that is not possible and the display is limited to one surface.

SUMMARY OF THE INVENTION

It is accordingly an object of the present invention to provide a system which can be used to detect the position of a wide variety of objects, including the human finger, over a flat rectangular area. It is a further object to provide such a system which is readily adaptable in a non-complex manner to conventional flat surfaces such as a CRT screen, a printed representation of a keyboard or a graph and which can provide an appropriate (x, y) indication of the location of the object over the surface.

It is a further object to provide a system which can utilize ultrasonic transducers to provide an indication of an object without the requirement that a specialized surface be provided. It is a further object to provide an apparatus which can be mounted onto a wide variety of surfaces including a standard television set, is adaptable to standard computer hardware and software, may determine the position of a wide variety of objects including the human finger, may operate inside a frame, and which does not require a specialized rim or backboard in order to avoid false signalling and signal noise. It is a further object of the invention to provide a method for performing position determination measurements which is adaptable to the abovestated variety of surfaces and which can be used to detect the position of diverse objects including the human finger for providing an appropriate position signal to a computer.

Therefore, in accordance with one aspect of the invention, an apparatus is provided which uses a pair of ultrasonic transducers in determining the position of any of the variety of objects. The transducers are pulsed in several frequencies and a receiving means receives echos from each pulse. A discriminator elects desired echos in accordance with a time delay, the frequency, and the magnitude of signals, and the elected echos are used to measure the distance of the object from the transducers to determine the position of the object. The position of the object is provided to a computer using a standard computer interface.

In order to both transmit and receive from one transducer, the following pattern is used: (1) The transducer transmits the ultrasonic pulses; (2) The system blanks the receiver for a long enough time, in order to not detect false signals caused by the transmission; (3) The system receives the reflected ultrasonic pulses.

In order to transmit and receive sound in a planar area, the transmitting and receiving of sound is directed in a pattern having approximately a 90 degree spread within the plane and raising from the plane less than 5 degrees. This may be accomplished by either specially shaping the transducers or by providing acoustic lenses on each transducer. The apparatus may then be placed on any of a variety of flat surfaces, such as a CRT tube.

The system may also use transducers having a 90 degree spread within the plane and raising from the plane more than 5 degrees. A plate is placed in front of the transducers, covering the half of the transducer which is closest to the flat surface so that the echo from this plate is received after the transmitted signal is transmitted, in the blanking periods so that this echo will not be registered. This makes the transducer have a 90 degree spread within the plane. The system will operate properly if the target is tilted away from the transducers, since the first echos will be from the tip of the target, which also indicate the wanted position.

According to another aspect of the invention, a method is provided for determining the positioning of an object in a plane in which a series of monotone pulses having a plurality of frequencies are used to transmit ultrasonic signals and receive echos from these pulses. The control of the system is made so that that the transducers are driven in four modes determined by which transmitter transmits pulses and which transducer receives the echos of the pulses, thus enabling the system to be used inside frames. A determination of which of the received echos are within a desired range is made and the location of the object is calculated by measuring the time delay of the echos from each transducer, after which a signal of the location is provided to a computer.

According to a further aspect of the invention, a time gain control is used to narrow the beam of the transducer enabling the system to operate inside any size frame.

According to a further aspect of the invention, the number of pulses transmitted is controlled, so that the system can detect any target when used in the mode where one transducer transmits and the other receives. It further makes range variable where one transducer cannot detect a target when used to both transmit and receive.

BRIEF DESCRIPTION OF THE DRAWINGS

FIG. 1B shows a view of the relationship between the transducer, screen and plate;

FIG. 1C shows a view of the transducer beam showing the effect of the plate upon the beam.

FIG. 7 shows the status of the control for generating the four modes;

FIG. 8 shows the block diagram of one of the algorithms;

DETAILED DESCRIPTION OF THE PREFERRED EMBODIMENT

Figure 1A:
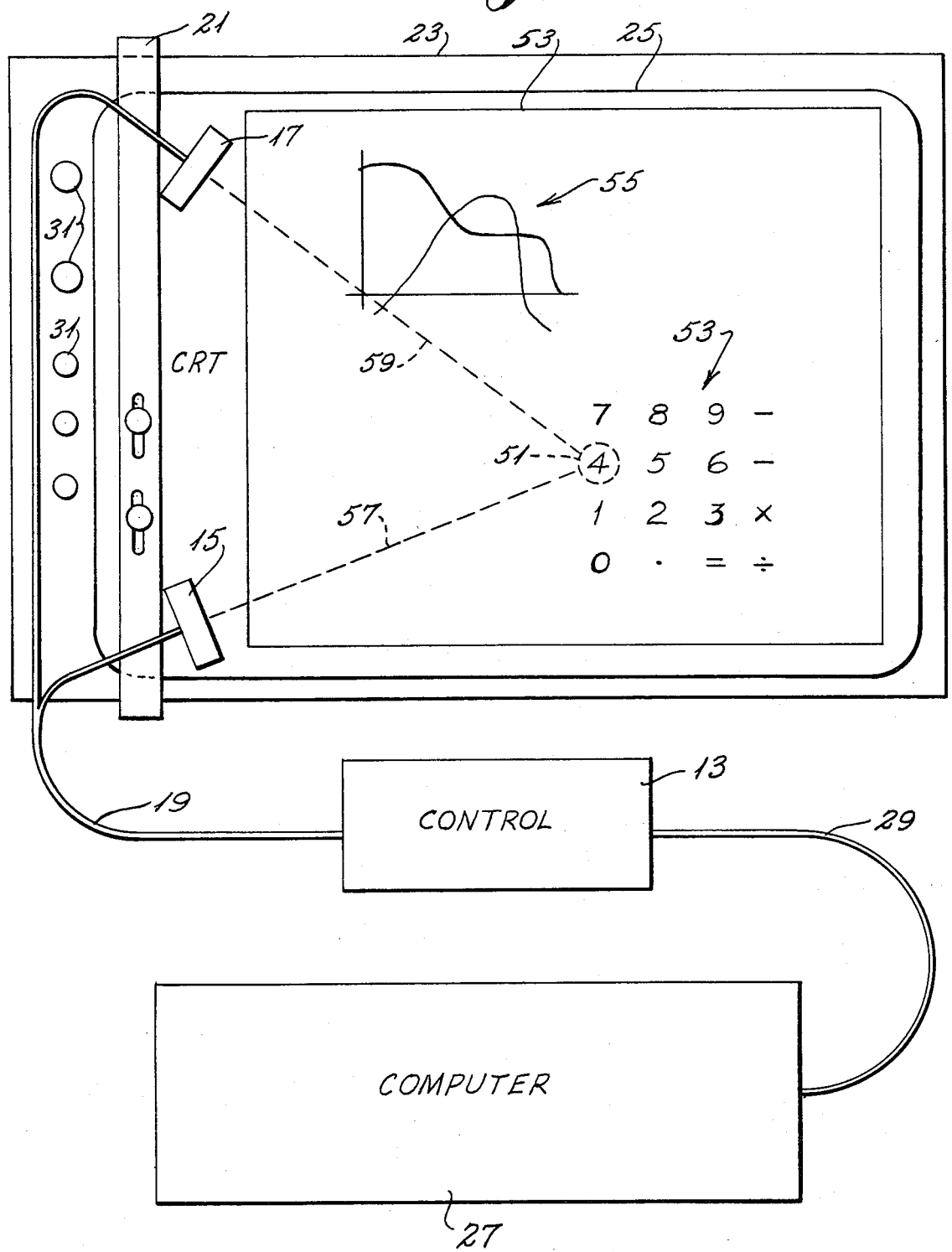
FIG. 1A shows the ultrasonic positioning system according to the invention mounted on a CRT display and connected to a computer.

Referring to FIG. 1A, the position sensing system according to the invention comprises a control unit 13 which is connected to a pair of transducers 15, 17 by cable 19. The transducers 15, 17 are mounted on an adjustable clamp 21 which is clamped onto a box-like structure having a flat surface such as a cathode ray tube (CRT) monitor 23. The CRT monitor 23 naturally has a CRT tube whose front is defined by a face mask 25.

The face mask 25 is merely a glass cover which is found on the fronts of all televisions and most other devices using CRTs to protect the CRT and consequently the user from implosion should the CRT encounter a minor impact.

The position-sensing system is controlled by and provides information to a computer 27 and is connected to the computer by a bus 29. While the computer 27 may be either a microprocessor, a microcomputer, a minicomputer or a mainframe computer, an Apple II microcomputer is used in the preferred embodiment of the invention.

Referring still to FIG. 1A, the ultrasonic transducers 15, 17 transmit a series of ultrasonic pulses in a pattern which would cause a maximum signal to occur in a plane segment occurring within an approximately 90 degree arc, with the plane of the plane segment being parallel to and closely adjacent to the face mask 25. As shown in FIG. 1A, the transducers 15, 17 are themselves closely adjacent to or touching the face mask 25. The transmission pattern is such that it is substantially planar, rising at a rate of less than 5 degrees from its generating transducer 15 or 17, and preferably at a rate of less than 2 degrees from the transducer. Since the transducers 15, 17 have a flattened transmission pattern, they will also have a flattened reception pattern. This pattern characteristic is important because it is undesirable that a system respond to objects not intended to be detected. These unintended objects may include parts 31 of the CRT monitor 23, as well as objects which may or may not be approaching the face mask 25. A transducer with a beam of a 90 degree arc in the vertical plane and a 90 degree arc in the horizontal plane can be used if the target is tilted away from the transducers. The first echo will be from the tip of the target, which also indicates the wanted position. A plate 70 is placed in front of the transducer 15, covering the half of the transducer which is closest to the CRT screen, see FIG. 1B. A similar plate is placed a distance from the transducer so that the echo is received in the system's blanking period. This means that the plate must be placed a distance d $15.2 < d < 118.2$ mm from the transducer if five pulses are transmitted. It is preferable to get the echo from the plate as early in the blanking period as possible so a distance of 15.5 mm is chosen. The plate gives the transducer a 90 degree beam over the preferred flat surface. A filtering using the average position change is used to screen out targets approaching the face of the mask 25.

Referring to FIG. 1A, in order to both transmit and receive from one transducer 15 or 17, the following pattern is used: (1) The transducer transmits the ultrasonic pulses which for 56 pulses takes approximately 1 msec, and for 5 pulses takes approximately 0.089 msec; (2) The system blanks the receiver for a long enough time (0.6 msec), in order to not detect false signals caused by the transmission; (3) The system receives the reflected ultrasonic pulses. The system is ready to receive reflected ultrasonic pulses after approximately 1.6 msec if 56 ultrasonic pulses are transmitted, which is equivalent to reflection from a target at the distance 274.6 mm from the transducer, and is ready to receive reflected ultrasonic pulses after approximately 0.689 msec if 5 ultrasonic pulses are transmitted, which is equivalent to reflection from a target at the distance 118.2 mm from the transducer.

Figure 2:
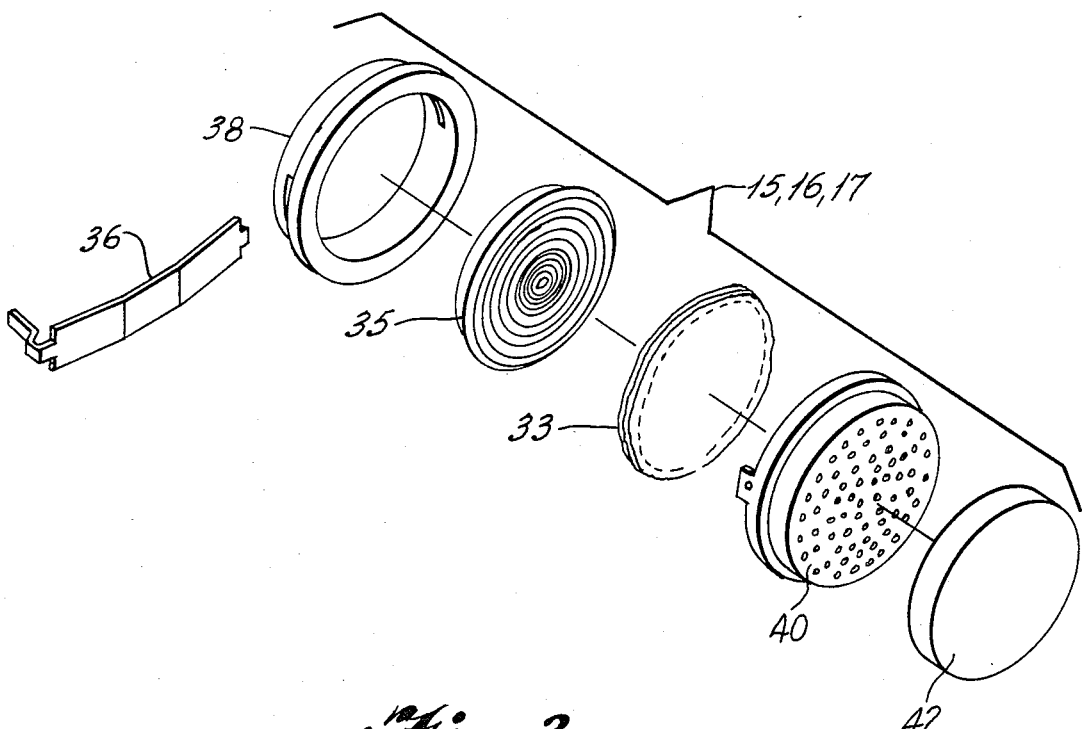
FIG. 2 shows a transducer used in the ultrasonic scanning system of FIG. 1.

The flattened pattern is accomplished either by providing specially shaped transducers or by using an acoustic lens 42 (FIG. 2). If an acoustic lens is used, the beam transmitted by each transducer 15, 17 is changed by placing a convergent acoustic lens 42 in front of the transducer. Convergent acoustic lenses exist, but only on a laboratory level; no convergent lens exists with the needed specifications. In either case, acoustic horns may be used to further refine the transmission reception patterns.

If acoustic lenses prove difficult to obtain, the transducer itself is specially constructed so as to provide a flattened beam pattern. Referring to FIG. 2, a transducer, such as transducer 15 comprises foil 33 which is stretched over a grooved backplate 35. The grooved backplate 35 forms a capacitor with the foil 33 which when charged exerts an electrostatic force on the foil 33. In order to maintain the foil 33 separate from the backplate 35, a bias DC voltage of 150 volts is applied.

The retainer 36 is spring loaded to the backplate 35 forming the one contact. The inner ring 38 is used to hold the retainer 36 and keep the backplate 35 and the foil 33 in place in the metal housing 40, which forms the second contact. In receiving sound echos, the foil 33 flexes against the backplate 35, thereby varying the capacitance of the transducer 15. In order to flatten the beam, the transducer is given the shape of an ellipse.

Figure 3:
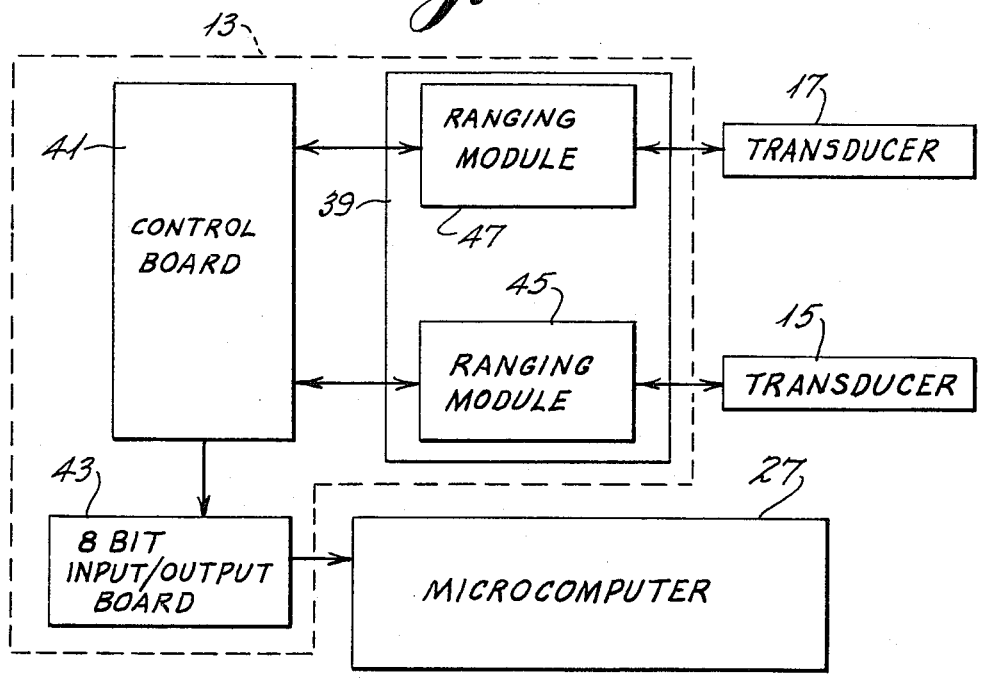
FIG. 3 shows a block diagram of the ultrasonic position sensing system according to the invention.

Referring to FIG. 3, the transducers 15, 17 are connected to the control unit 13 in order that signals may be processed between the transducers 15, 17 and the computer 27. Within the control unit 13 is an ultrasonic circuit board 39, a control board 41 and an input/output board 43. The ultrasonic control board 39 comprises a pair of ranging modules 45, 47 each of which is used to operate one of the two transducers 15, 17 respectively.

Each ranging module 45, 47 contains all of the necessary components to generate a drive signal for driving the transducers 15 or 17 associated with the module 45 or 47 and to control timing functions. The ranging modules 45, 47 also receive, amplify and filter the echo signal received by the transducers and process this signal, thereby providing a step function output at the time of the received echo. Such ranging modules are manufactured by Polariod Corporation for use with Polariod's ultrasonic ranging system (PURS) and are used in automatic ranging camera circuits to detect the distance of an object from a camera in order to operate a camera focusing circuit. Polaroid's PURS ranging modules are designed to operate from 0.26 m to 10.7 m by using a distance time/gain control. Since the present system is only supposed to operate up to less than 1 m, the time/gain control is modified by adjusting appropriate voltages in the ranging modules, in order to control the width of the transducers' beam. Conceptually, the ranging modules 45, 47 provide a driving signal to cause the transducers 15, 17 to transmit pulses and interpret signals received from the transducers 15, 17 as representing echos of the transmitting pulses.

The ranging modules 45, 47 on the ultrasonic circuit board 39 are caused to pulse by signals from the control board 41. The control board 41 also receives echo signals from the ranging modules 45, 47 and uses these echo signals to determine the positions of an object 51 (see FIG. 1) reflecting the sound to produce the echo. The control board 41 also cooperates with the ranging modules 45, 47 to discriminate between preferred echos and extraneous signals in order to elect preferred echos.

Figure 4:
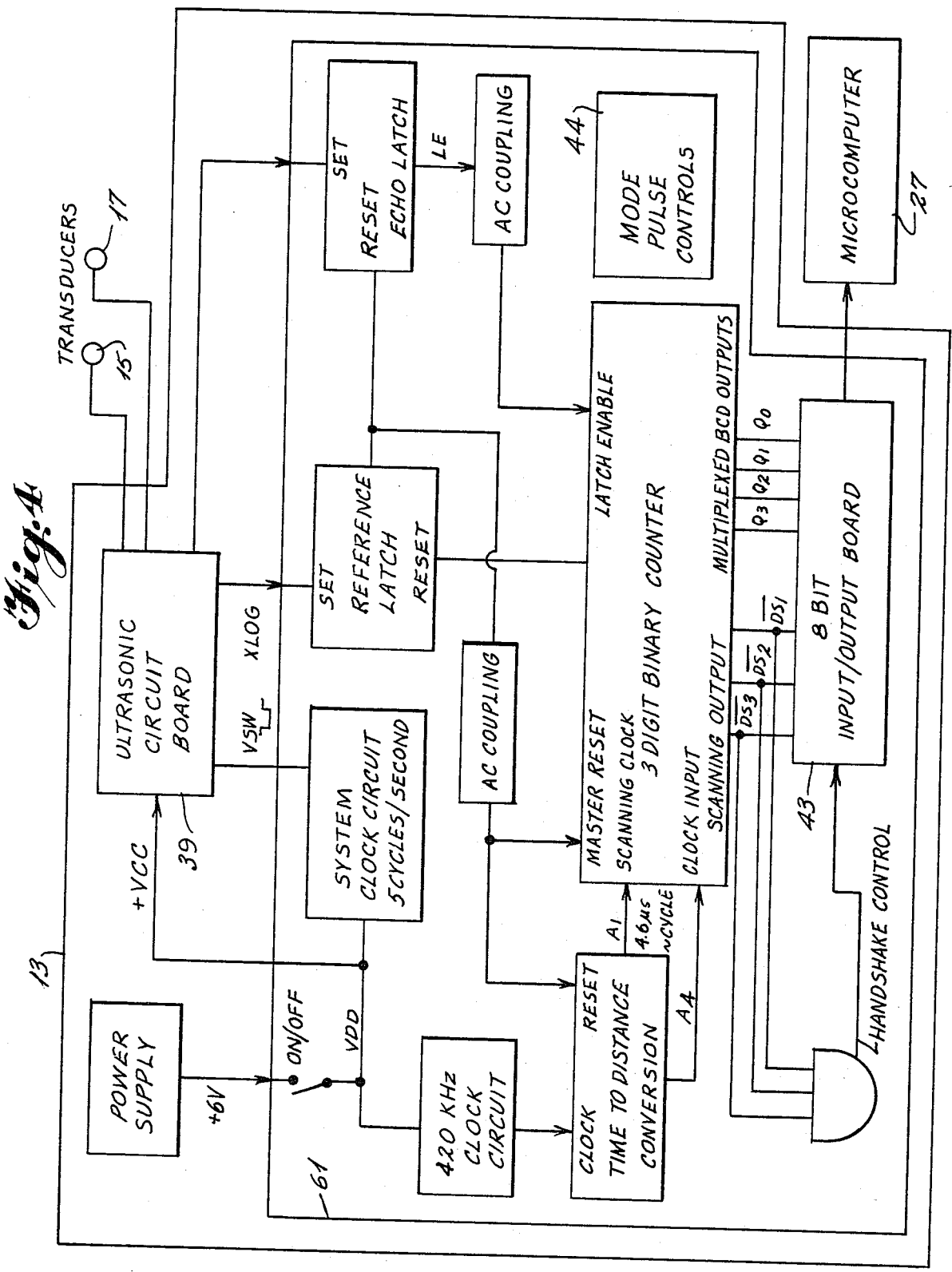
FIG. 4 shows details of the block diagram in FIG. 3.
Figure 5:
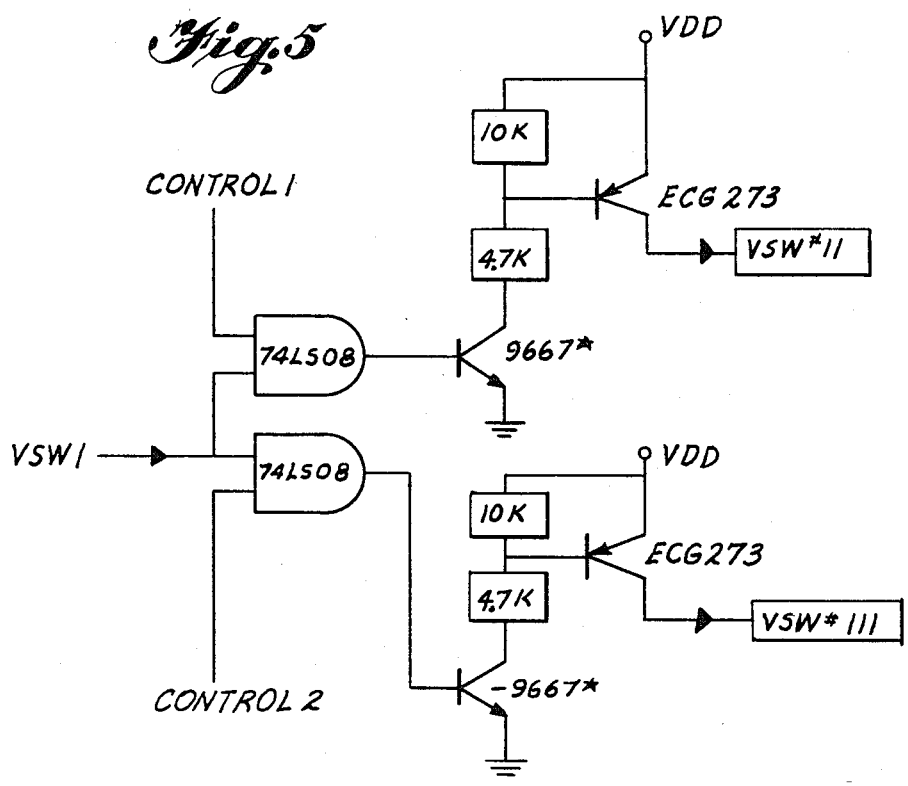
FIG. 5 shows a the circuitry for control 1 and 2.
Figure 6:
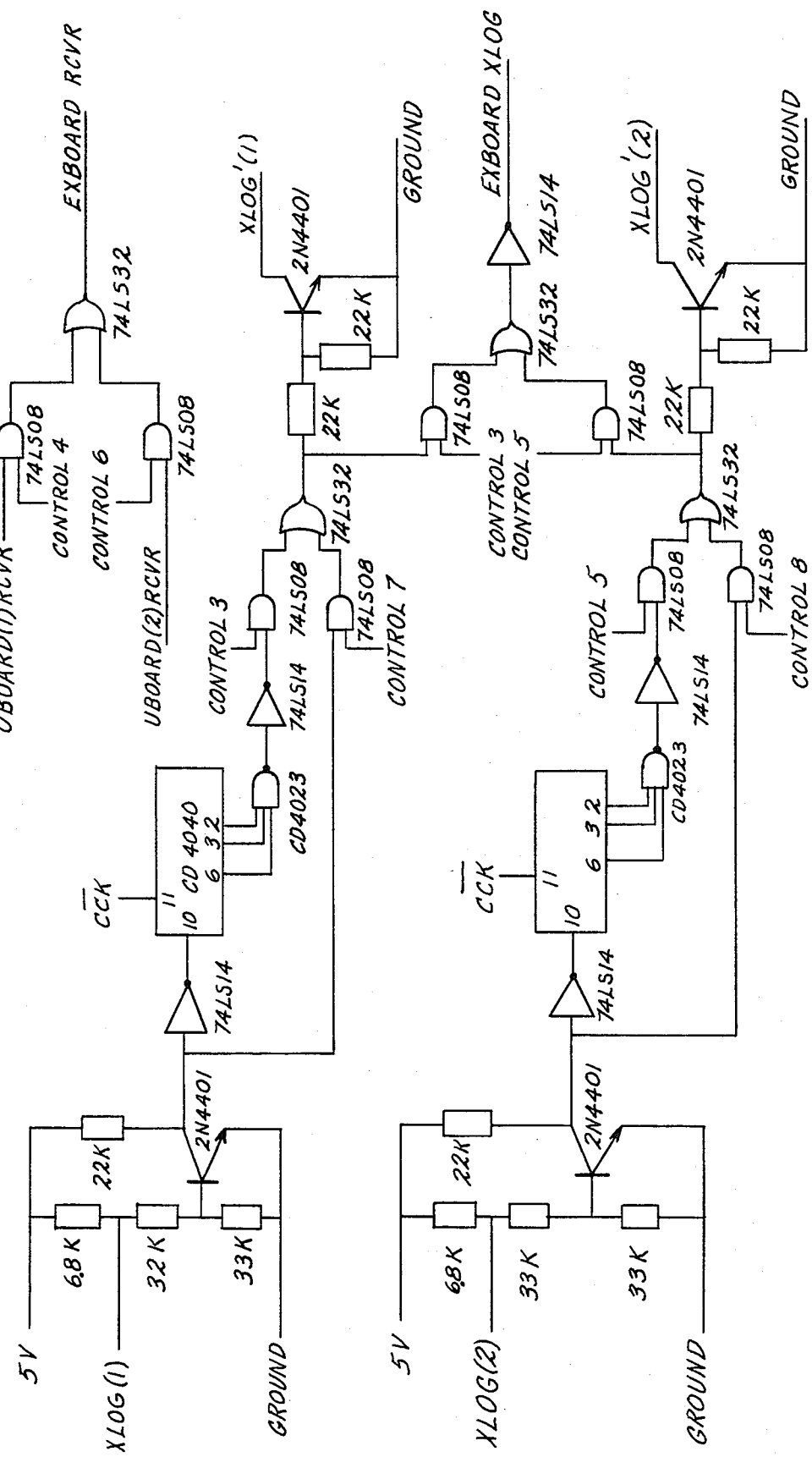
FIG. 6 shows the circuitry for control 3 to 8.

Referring to FIG. 4, a typical circuit blockdiagram is shown. The mode/pulse controls 44 are described below. The circuitry for controls 1 and 2 is shown in FIG. 5. The circuitry for controls 3 to 8 is shown in FIG. 6. The status of the controls is shown in FIG. 7, which enables the system to operate in four modes:

1. transmit and receive from the first transducer 15;
2. transmit and receive from the second transducer 17;
3. transmit from the first transducer 15 and receive from the second transducer 17;
4. transmit from the second transducer 17 and receive from the first transducer 15.

Referring to FIG. 7 in the first mode, transmit #1 and receive #1, controls 1, 3, and 4 are on and controls 2, 5, 6, 7 and 8 are off. The symbol 1 is used for on and the symbol 0 is used for off, as the controls are made by logic AND ports. (See FIGS. 5 and 6). In mode 2, transmit #2 and receive #2, controls 2, 5 and 6 are on and controls 1, 3, 4 7 and 8 are off. The status of controls 1-8 for the third and fourth modes is read from FIG. 7 in the same fashion.

The output from the control board 41 is provided to the input/output board 43 which serves as a buffer for interfacing with the microcomputer 27. In the preferred embodiment, the input/output board 43 is an eight bit input/output board. The 8 bit representation of the distances is made in order to connect the system with a commercially available 8 bit microcomputer. The 8 bit representation gives an accuracy of $+-1.95$ mm. The system can be interfaced through a 12 bit input/output port, which combined with 12 bit calculations will give an enhanced accuracy of $+-0.12$ mm.

The block diagram of an algorithm for the system placed inside a frame is shown in FIG. 8. The elected echos must be received after the time period for transmission of signal and blanking of the transducer, making it ready for receiving echos. The distance is determined by multiplying the half of this time with the speed of sound. The two transducers must be separated by more than twice this distance.

The elected echos must also be received within a time period determined by the greatest distance from the first transducer to the furthest part of the preferred region 53 of the plane and back to the second transducer. The distance is determined by multiplying this time with the speed of sound. This happens when one transducer transmits and the other transducer receives.

The elected echos must further be received within a time period determined by twice the shortest distance from a transducer to the frame as divided by the speed of sound. This happens when one transducer transmits and receives.

The computer 27 generates, in this case, the signals for the control as shown in FIG. 7, and synchronizes the input from the control unit 13 with the remainder of the computer software, which calculates the position, and interfaces with the computer's display 53, 55 on the CRT 22.

Figure 9:
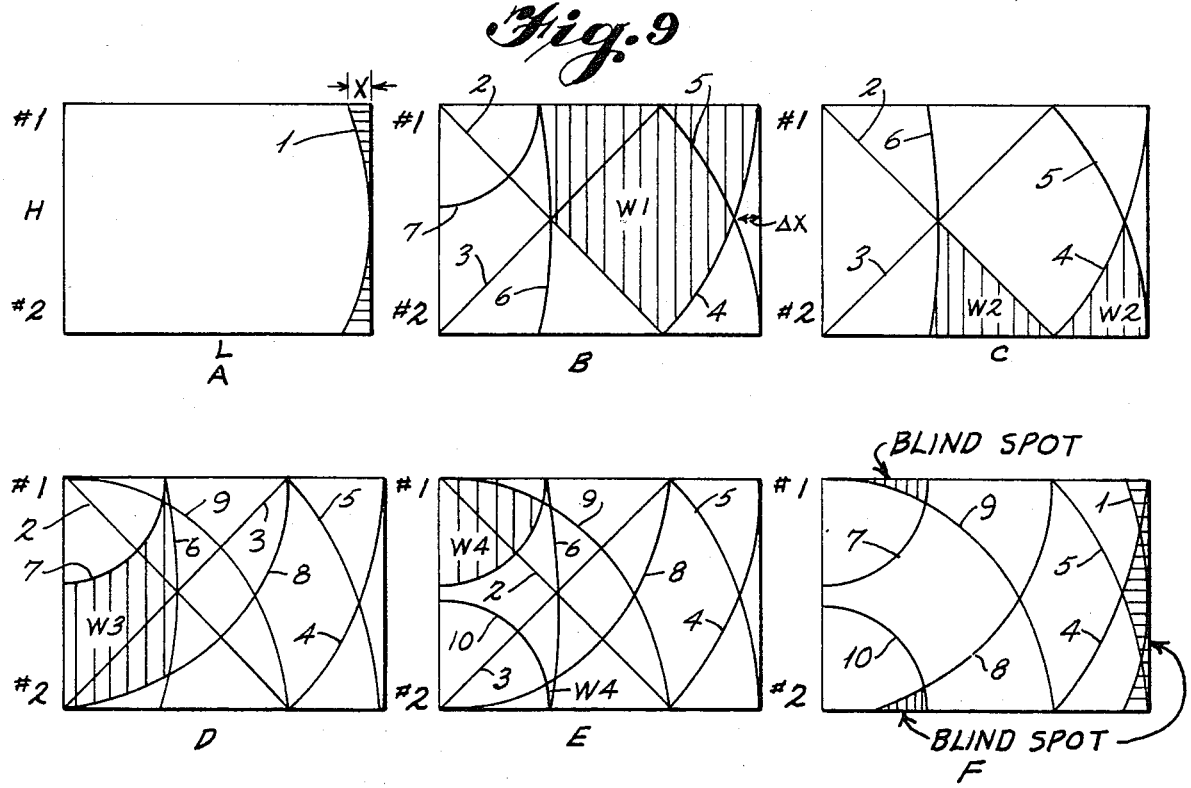
FIG. 9 shows the area covered for operation inside a frame around the flat surface.

FIG. 9 shows which areas are covered at which times on the CRT screen. It also shows the blind spots in which the system cannot operate.

FIG. 9 is a graphic explanation of the block diagram shown in FIG. 8. The explanation of the six FIGS. 9A–F is as follows:

Areas with horizontal lines indicate blind spots.
Areas with vertical lines indicate covered areas.

(A) This illustrates the mode where transducer #1 transmits and #2 receives and the mode where transducer #2 transmits and transducer #1 receives. Graph 1 is the graph where the sum of the distances from the transducers R1+R2=R3MAX. The maximum distance is found from $$R3MAX = [L^2 + (H/2)^2]^{\frac{1}{2}} \quad (1)$$

An echo from a target in the blind spot will not be detected since the sum of the distances R1+R2>(R3MAX=R4MAX), so an echo will be detected first from the end wall.

(B) This illustrates the mode where transducer #1 transmits and receives with a narrow beam (45 degrees) in the vertical plane. Line 2 is 45 degrees from the transducer #1 and Line 3 is 45 degrees from transducer #2. Graph 4 indicates the maximum distance R1MAX' (reflection from the end wall corner) from transducer #1. Graph 5 indicates the maximum distance R2MAX' from transducer

2. The distance ΔX is the maximum distance from the end wall of the blind spot. Graph 6 indicates the distance RTMAX. It is found from $$RTMAX = (H/2) \, TAN \, (45) \qquad (2)$$

This distance is used in order to use as few modes as possible to cover the whole work area. Graph 7 is the minimum distance RMIN in which transducer #1 can detect a target if used to both transmit and receive. If all the answers to the questions in column 1 in FIG. 8 are yes, the target will be in the area W1.

(C) This illustrates the mode where transducer #2 transmits and receives with a narrow beam (45 degrees in the vertical plane). If the answer to the question in column 2 in FIG. 8 is yes, then the target is in area W2.

(D) This illustrates the mode where transducer #1 transmits and receives with a wide beam 90 degrees in the vertical plane. Graph 8 indicates the maximum distance R1MAX (reflection from the closest corner) from transducer #1. Graph 9 indicates the maximum distance R2MAX from transducer #2. If the answer to the question in column 3 in FIG. 8 is yes, then the target is in area W3.

(E) This illustrates the mode where transducer #2 transmits and receives with a wide beam (90 degrees in the vertical plane). Graph 10 indicates the minimum distance RMIN in which transducer #2 can detect a target if used to both transmit and receive. If the answer to the question in the fourth column in FIG. 8 is yes, then the target will be in the area W4.

(F) This illustrates the blind spots of the system. If the answer to the question in the fourth column in FIG. 8 is no, the target will be in one of these blind spots.

The system will measure the distance from the one transducer to the target and back to the second transducer. It will further measure either the distance from the first transducer to the target or the distance from the second transducer to the target. The position coordinates (x, y) can easily be determined here of.

It should be noted that the location on displays 53, 55 which is intended to be pointed to by the object 51 must be within a permissible range window 53 dictated by the blind spots shown in FIG. 9. As shown in FIG. 1, the object 51 is within the window 53 and reflects pulses along vectors 57 and 59.

While the ultrasonic position-sensing system can be connected in a number of ways, it is possible to integrate the control board 41 and the input/output board 43 into a large circuit board 61 within the control unit 13. This enables the control unit 13 to be made with as many conventional elements as possible in a manner well known to those skilled in the art.

The pulses transmitted by the transducers 15, 17 are transmitted at preferably four different frequencies, using monotone pulses. The generation of these frequencies is controlled by the control board 41 which also varies the number of pulses transmitted. In the preferred embodiment, the frequencies used are 60 kHz, 57 kHz, 53 kHz, and 50 kHz. Fifty-six pulses are the maximum number generated in a sequence, with a duration less than 1 msec; the blanking takes 0.6 msec. This transmission of different pulses is accomplished by the control board 41 providing appropriate control signals, as shown in FIGS. 4, 5 and 6, to the ultrasonic circuit board 39. Since the pulse sequence itself is controlled by the control board 41, the input/output board 43 can be made to function as an ordinary eight bit computer interface which is readily adaptable to a variety of computers including the above-mentioned Apple II computer. The input/output board 43 can be an eight bit parallel in/out TTL board, a serial port or a standard RS 232 serial interface port.

Figure 10:
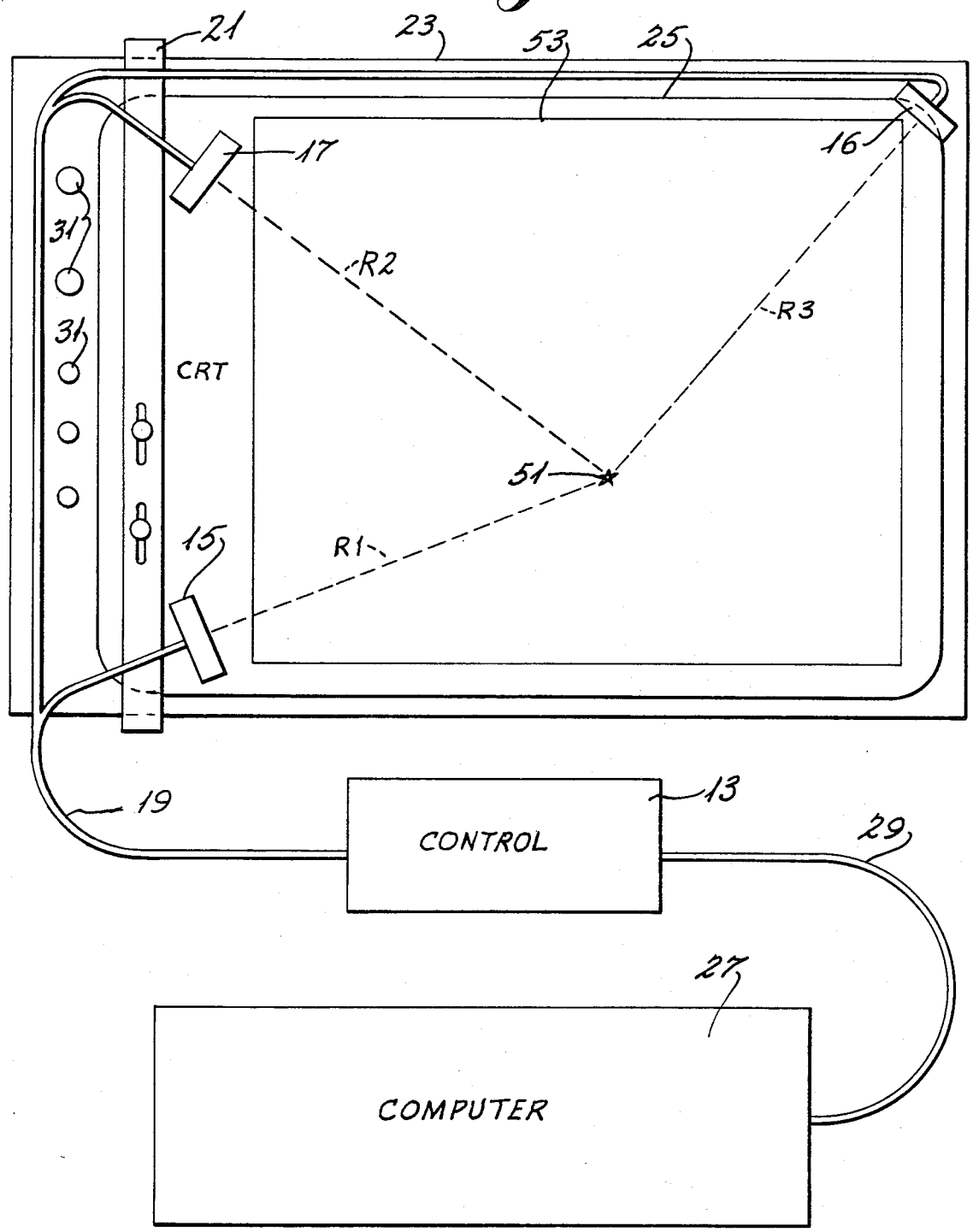
FIG. 10 shows the ultrasonic positioning system according to another embodiment of the invention with three transducers and the ability to determine the three-dimensional coordinates x, y, z.

Three transducers can be used to determine the position in three dimensions (x, y, z). Referring to FIG. 10, the third transducer 16 is placed in one of the two corners not occupied already by a transducer. The three transducers 15, 16 and 17 all have a 90 degree beam in both the horizontal and the vertical plane. The third transducer's beam is directed into the flat surface in a similar manner to the two first transducers' beams. The work area is a three-dimensional space directly in front of the CRT screen, and the system will measure the position of a target 51 in this area. The target must be tilted away from the transducers. The system has 12 modes: (1) the four modes by using transducers #1 and #2; (2) the four modes by using transducers #2 and #3, and (3) the four modes by using transducers #1 and #3. The position coordinates (x, y, z) can easily be found after the distances R1, R2 and R3 from the three transducers to the target are measured. The control circuitry is essentially the same for this system in three dimensions as for the system in two dimensions; however, more controls must be added. The computer programs for control and calculations are also similar for the two systems.

While the invention has been shown in terms of a preferred embodiment, it should be clear to those skilled in the art that it is possible to make numerous changes without departing from the inventive spirit of the system. For example, instead of a flat surface for positions to be detected being the face mask 25 of the CRT 23, the flat surface can be one of a series of special charts, medical X-ray photographs, a printed display of a keyboard, a standard television or any of a variety of flat displays. While, in some cases, the surface itself may not be flat, as in the case of the face masks of most CRTs, the ultrasonic pulses would be transmitted in a flat plane immediately over the surface. More transducers can be used or the placement of the transducers can be different in an effort to achieve no blind spots and higher accuracy. Since there is a wide variety of applications and modifications possible with the present invention, the scope of the invention should be read only by the following claims.

What is claimed:
1. An apparatus for determining the position of any of a variety of objects in a preferred region of a plane comprised of:
  (a) first and second means, each said means transmitting and receiving ultrasonic pulses;
  (b) an ultrasonic driving means providing driving power to said first and second means in a series of pulses, the driving means driving said first and second means at a plurality of different frequencies and each pulse being a monofrequency output;
  (c) a receiving means to receive an echo of a sound pulse from said first and/or second means;
  (d) a discriminator means to elect preferred echos in accordance with a time delay and magnitude of signals representing the echos received from said first and/or second means, the election criteria including

(i) the elected echos must be received after a first time period in which said means has transmitted an ultrasonic pulse and blanking of said means during a blanking period has occurred, said first and second means being separated by more than twice a distance determined by multiplying half of said first time period with the speed of sound;

(ii) when the apparatus is operated whereby one of said means transmits and the other of said means receives, the elected echos must be received within a second time period determined by the greatest distance from one of said means to the furthest part of said preferred region of said plane and back to the other of said means as divided by the speed of sound;

(iii) when the apparatus is operated whereby one of said means both transmits and receives said pulses, the elected echos must be received within a third time period determined by twice the shortest distance from said one of said means to the preferred region of said plane divided by the speed of sound;

(e) a time-measuring means to measure the time delay between each transmitted pulse and each elected echo;

(f) a means to determine a location of the source of the elected echos by deriving information from the measured time delays;

(g) a computing module means including a microprocessor to (i) generate signals controlling said first and second means and (ii) calculate said positon; and (h) a computer interface means to provide a signal representative of the location of the source of the echos to a computer.

2. The apparatus of claim 1 wherein said first and second means comprise ultrasonic transducers including metallic foil stretched over a backplate, thereby forming a capacative element.

3. The apparatus of claim 2 wherein the backplate is grooved and the backplate is shaped so as to transmit a flat primary beam such that the intensity of sound transmitted in a 90° arc through said preferred region of the plane is greater than the intensity of sound transmitted at 5° from the plane as viewed from the transmitter.

4. The apparatus of claim 1 wherein a convergent accoustic lens directs sound from said first and second means into a flat pattern so that the intensity of sound within a 90° arc through the preferred region of the plane is greater than the intensity of sound 5° above the plane at the same distance as viewed from either the first or second means.

5. The apparatus of claims 1, 3 or 4 wherein the object whose position is determined is a human finger.

6. The apparatus of claim 2 wherein the backplate is grooved and shaped so as to transmit a primary beam such that the intensity of sound transmitted in a 90° arc through said preferred region of said plane is greater than the intensity of sound transmitted at 90° from the plane as viewed from one of said transducers, said source of said echos being tilted away from said transducers.

7. The apparatus of claim 1 wherein said first and second means are mounted over a flat surface so that an object placed on or close to the surface passes through the plane in order that a user of the device may select a position on the surface to be determined by the apparatus.

8. The apparatus of claim 5 wherein the apparatus further comprises clamps for adapting the apparatus to be mounted on a display device.

9. The apparatus of claim 8 wherein the display device is a cathode ray tube.

10. The apparatus of claim 1 wherein a time gain control varies the duration of the pulses in accordance with the frequency at which a pulse is transmitted.

11. The apparatus of claim 10 wherein the plurality of different frequencies comprises at least four frequencies.

12. The apparatus of claim 11 wherein at least twenty pulses are generated during any sequence, with the time duration of the pulses being increased in accordance with the frequency, the time duration of transmittal of the higher frequency pulses being greater than the duration of transmittal of the lower frequency pulses.

13. The apparatus of claim 1 wherein said first and second means are driven simultaneously for the duration of some of the pulses.

14. The apparatus of claim 13 wherein said first and second means are driven separately for the duration of some of the pulses.

15. The apparatus of claim 14 wherein said first and second means are driven to produce the pulses in one of four modes in any sequence which comprise:
(i) transmitting and receiving from a first of said first and second means;
(ii) transmitting and receiving from a second of said first and second means;
(iii) transmitting from said first means and receiving from said second means; and
(iv) transmitting from said second means and receiving from said first means.

16. The apparatus of claim 15 wherein the first and second means are caused to produce at least 56 pulses per millisecond.

17. The apparatus of any one of claims 1 or 4 wherein a plate is placed in front of each of said first and second means which generates an echo during said blanking period to thereby cause said first and second means to transmit a 90° beam in a horizontal plane directly over said plane.

18. The apparatus of any one of claims 2, 3 or 6 wherein a plate is placed in front of each of said transducers which generates an echo during said blanking period to thereby cause said transducers to transmit a 90° beam in a horizontal plane directly over said plane.

19. The apparatus of any one of claims 3 or 6 further including a time gain control which varies the width of said beam.

20. The apparatus of claim 1 wherein the means to determine calculates the average position of the object and the square of the average position change of the object.

21. The apparatus of claim 1 wherein the determination of the position of the object is operable either in a drawing mode wherein coordinates of the object are calculated continuously or in a symbol selection mode wherein the coordinates of the object are calculated in a manner which permits the user to select a portion of the preferred region of the plane.

22. The apparatus of claim 1 wherein the signal representative of the location of the source of echos is an 8 bit or 12 bit number which may be interfaced by the computer interface means to a computer port so as to be compatible with standard computer systems.

23. The apparatus of claim 1 wherein the signal representative of the location of the source of echos is an 8 bit or 12 bit number which may be interfaced by said computer interface means to a computer port, whereby said computer generates said control signals and calculates said position.

24. The apparatus of claim 1 wherein the preferred region is surrounded by a frame.

25. A method for determining the position of any of a variety of objects in a preferred region of a plane comprising:
   (a) transmitting a plurality of monotone ultrasonic pulses having a plurality of frequencies through a pair of transducers;
   (b) receiving echos of the pulses from each transducer;
   (c) selecting a time-dependent range of echos received;
   (d) determining which echos within the range are representative of the position of the object;
   (e) calculating the location of the object by measuring the time delay of the echo and thereby determining the distance of the object from each transducer and the distance from one transducer to the object and back to the second transducer; and,
   (f) providing a signal compatible with a computer, indicative of the position of the object so that a person using the method may select a position on or immediately below the preferred region of the plane by pointing to the position, the preferred region being surrounded by a frame.

26. A method for determining the position of a variety of objects in a preferred three-dimensional work area comprising:
   (a) positioning three transducers substantially in a commmon plane within the work area;
   (b) transmitting a plurality of monotone ultrasonic pulses having a plurality of frequencies through each of the transducers;
   (c) receiving echos of the pulses from each transducer;
   (d) selecting a time-dependent range of echos received;
   (e) determining which echos within the range are representative of the position of the object;
   (f) calculating the location of the object by measuring the time delay of the echos and thereby determining the distance of the object from each transducer;
   (g) providing a signal compatible with a computer indicative of the position of the object so that a person using the method may select a position in said work area by pointing with an object to the position; and
   (h) surrounding at least a portion of said work area with a frame.

* * * * *